US012777127B2

(12) United States Patent
Baek

(10) Patent No.: US 12,777,127 B2
(45) Date of Patent: Oct. 27, 2026

(54) VIDEO RECORDING SYSTEM FOR VEHICLE AND METHOD OF CONTROLLING THE SAME

(71) Applicants: HYUNDAI MOTOR COMPANY, Seoul (KR); KIA CORPORATION, Seoul (KR)

(72) Inventor: Joo Am Baek, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 18/957,073

(22) Filed: Nov. 22, 2024

(65) Prior Publication Data

US 2025/0385984 A1 Dec. 18, 2025

(30) Foreign Application Priority Data

Jun. 14, 2024 (KR) ........................ 10-2024-0077557

(51) Int. Cl.
*H04N 5/77* (2006.01)
*H04N 7/18* (2006.01)

(52) U.S. Cl.
CPC ................. *H04N 5/77* (2013.01); *H04N 7/18* (2013.01)

(58) Field of Classification Search
CPC .................................. H04N 5/77; H04N 7/18
See application file for complete search history.

(56) References Cited

U.S. PATENT DOCUMENTS

2015/0077556 A1* 3/2015 Reed ...................... H04N 7/183 348/148
2017/0365161 A1* 12/2017 Rabb ...................... H04L 67/55
2019/0180123 A1* 6/2019 Yamada ................. G06V 20/58
2019/0222797 A1* 7/2019 Teruuchi .................. G07C 5/04
2023/0018277 A1* 1/2023 Sakai .................... B60W 40/08
2023/0202406 A1* 6/2023 Jeong ...................... B60R 11/04 348/148
2023/0260289 A1* 8/2023 Tabata ................... G06V 20/58 348/148
2024/0195934 A1* 6/2024 Han ....................... H04N 7/181

FOREIGN PATENT DOCUMENTS

DE 102023120134 A1 * 1/2025 ............. B60R 25/20
EP 3561786 A1 * 10/2019 ............. B60R 25/10

* cited by examiner

*Primary Examiner* — Anner Holder
(74) *Attorney, Agent, or Firm* — MCDONNELL BOEHNEN HULBERT & BERGHOFF LLP

(57) ABSTRACT

Disclosed is a video recording device including a camera module configured to acquire a video of the surroundings of a vehicle, a motion detection sensor configured to detect a motion of a nearby object, a first memory configured to store the video, and a controller configured to control the storing of the video. The controller includes a second memory configured to store a computer program for storing the video, and a processor configured to execute the computer program. When the computer program is executed by the processor, the controller is configured to determine whether to store the video according to a set condition for motion detection within a set distance.

20 Claims, 3 Drawing Sheets

VIDEO RECORDING SYSTEM FOR VEHICLE AND METHOD OF CONTROLLING THE SAME

CROSS-REFERENCE TO RELATED APPLICATION(S)

This application claims the benefit of Korean Patent Application No. 10-2024-0077557, filed on Jun. 14, 2024, which is hereby incorporated by reference as if fully set forth herein.

TECHNICAL FIELD

The present disclosure relates to a vehicle video recording device and a method of controlling the vehicle video recording device.

BACKGROUND

A video recording device for a vehicle refers to a device configured to record videos or images of, for example, situations where a vehicle is traveling or parked.

The video recording device may generally be referred to as a driving video recording device because it is intended mainly to acquire videos or images of an accident or the like that may occur while the vehicle is traveling.

To acquire videos or images, the video recording device may basically include a controller, a memory for storing videos or images, and a camera for capturing and recording videos or images.

In general, the video recording device may store a video of the surroundings of a vehicle while the vehicle is traveling, along with data on driving of the vehicle at a time corresponding to the video and, when the occurrence of a set event is detected even while the vehicle is parked, record a video according to the already input settings.

The video recording device for a vehicle, also referred to as a black box (or a dash camera), was initially provided (e.g., only) as an external device, but has recently been embedded and provided as a built-in device in a vehicle before the vehicle is released from a factory.

Video recording in a parked state where a vehicle is parked may include always-on recording that performs recording substantially continuously while the vehicle is parked (which may also be referred to herein as "always-on parking recording"), depending on what is selected by a user, in addition to event-based recording (or simply "event recording" herein).

In this case, the recording time of the always-on parking recording may change depending on the state of a battery, and it may not meet a consumer demand for long-time recording.

Therefore, an alternative that may fulfill this consumer demand would be beneficial.

SUMMARY

An object of the present disclosure is to solve at least one of the issues described above.

An object of the present disclosure is to provide a method of increasing an available recording time while a vehicle is parked.

An object of the present disclosure is to provide a method of detecting, in advance, a situation that benefits from (e.g., highly requires) recording in a parked state and performing the recording.

An object of the present disclosure is to provide a method of detecting a motion around a vehicle and determining whether to record (e.g., a need for recording).

An object of the present disclosure is to provide a method of dealing with a false detection situation where a motion is detected by snow or rain and a motion detection situation where a motion is detected by an occupant in a vehicle, when detecting a motion around the vehicle.

According to at least one embodiment of the present disclosure, there is provided a video recording device including a camera module configured to obtain a video of surroundings of a vehicle, a motion detection sensor configured to detect a motion of a nearby object, a first memory configured to store the video, and a controller configured to control the storing of the video. The controller includes a second memory storing instructions for storing the video, and a processor configured to execute the instructions. The instructions cause, when executed by the processor, the controller to determine whether to store the video according to a set condition for motion detection within a set distance.

According to at least one embodiment, the determining whether to store the video may include, when the set condition for motion detection within the set distance is satisfied, determining to store the video.

According to at least one embodiment, the determining whether to store the video may include, when the set condition for motion detection within the set distance is not satisfied, determining not to store the video.

According to at least one embodiment, the determining whether to store the video may further include determining to store the video without applying the set condition to a motion detected outside the set distance.

According to at least one embodiment, the set condition may include an occupant absence condition related to an absence of an occupant in the vehicle.

According to at least one embodiment, the instructions may further cause the controller to determine the occupant absence condition using at least one of a door open/close signal, a seat occupancy sensor signal, and a rear occupant alert (ROA) signal of the vehicle.

According to at least one embodiment, the instructions may further cause the controller to determine the occupant absence condition using at least one of the seat occupancy sensor signal or the ROA signal, along with the door open/close signal.

According to at least one embodiment, the motion detection sensor may include a radar installed inside the vehicle.

According to at least one embodiment of the present disclosure, there is provided a video recording device, including a camera module configured to obtain a video of surroundings of a vehicle, a motion detection sensor configured to detect a motion of a nearby object, a first memory configured to store the video, and a controller configured to control the storing of the video. The controller includes a second memory storing instructions for storing the video, and a processor configured to execute the instructions. The instructions, when executed by the processor, cause the controller to, when the motion is detected outside a set distance, store the video, and when the motion is detected within the set distance, store the video based on an occupant absence condition related to the absence of an occupant in the vehicle.

According to at least one embodiment, the instructions may further cause the controller to determine the occupant absence condition using at least one of a door open/close signal, a seat occupancy sensor signal, and an ROA signal of the vehicle.

According to at least one embodiment of the present disclosure, there is provided a method of controlling a video recording device comprising a camera module configured to obtain a video of the surroundings of a vehicle, a motion detection sensor configured to detect a motion of a nearby object, a first memory configured to store the video, and a controller comprising a second memory storing instructions for storing the video and a processor configured to execute the instructions. The method comprising determining, by the processor executing the instructions, whether to store the video according to a set condition for motion detection within a set distance.

According to at least one embodiment, the determining whether to store the video may include, when the set condition for motion detection within the set distance is satisfied, determining to store the video.

According to at least one embodiment, the determining whether to store the video may include, when the set condition for motion detection within the set distance is not satisfied, determining not to store the video.

According to at least one embodiment, the determining whether to store the video may further include determining to store the video without applying the set condition to a motion detected outside the set distance.

According to at least one embodiment, the set condition may include an occupant absence condition related to the absence of an occupant in the vehicle.

According to at least one embodiment, the method may further comprise determining the occupant absence condition using at least one of a door open/close signal, a seat occupancy sensor signal, and an ROA signal of the vehicle.

According to at least one embodiment, determining the occupant absence condition may comprise determining the occupant absence condition using at least one of the seat occupancy sensor signal or the ROA signal, along with the door open/close signal.

According to at least one embodiment, the motion detection sensor may include a radar installed inside the vehicle.

According to embodiments of the present disclosure described herein, an available recording time while a vehicle is parked may be increased.

Further, according to embodiments of the present disclosure described herein, a situation that it is beneficial (e.g., needs) to be recorded while a vehicle is parked may be detected in advance, and the recording may be performed accordingly.

Further, according to embodiments of the present disclosure described herein, determining whether it is beneficial (e.g., there is a need) for recording may be based on a motion detected around a vehicle. In this case, it may be possible to deal with a false detection situation caused by snow or rain and a motion detection situation with a detected motion of an occupant in the vehicle.

DETAILED DESCRIPTION

Figure 1:
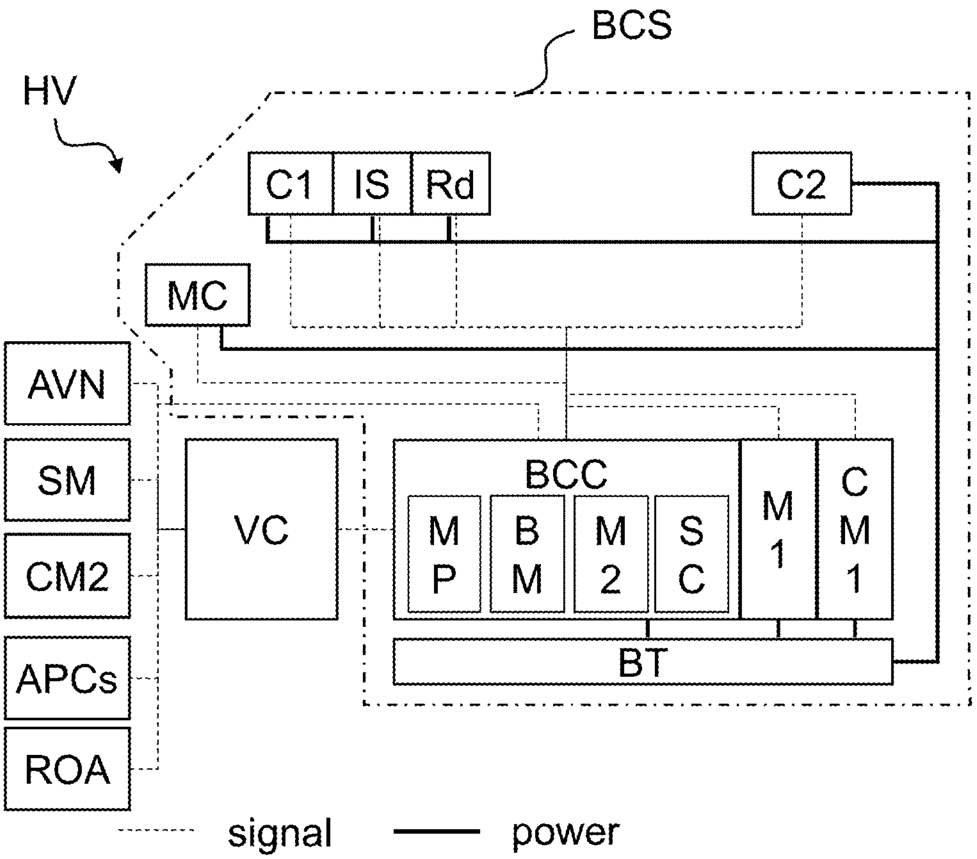
FIG. 1 is a block diagram illustrating a conceptual configuration of a video recording device according to an embodiment of the present disclosure.

Hereinafter, embodiments of the present disclosure will be described in detail with reference to the accompanying drawings. The embodiments are not construed as limited to the disclosure and should be understood to include all changes, equivalents, and replacements within the idea and the technical scope of the disclosure.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

Although terms including ordinal numbers, such as "first," " "second," and the like, may be used herein to describe various elements, the elements are not limited by these terms. These terms are (e.g., only) used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit," "control unit," "control device," or "controller" is merely a widely used term for naming an element that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are beneficial (e.g., necessary) for controlling a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), an electronic circuitry, and a logic circuitry.

The processor may be electrically connected to the memory, and the processor may load and record data from the memory. The memory and the processor may be integrated or may be physically separated.

Hereinafter, embodiments of the present disclosure will be described in detail with reference to the accompanying drawings.

Referring to FIG. 1, according to an embodiment of the present disclosure, an embedded driving video recording device, also referred to herein as a built-in camera system (BCS), may be embedded in a host vehicle (HV) and may include a camera module (CM), a first memory (M1), a communication module (CM1), a microphone (MC), an impact sensor (IS), an auxiliary power battery (BT), and a built-in camera controller (BCC).

The driving video recording device of the present disclosure may be embedded but is not necessarily limited thereto.

The camera module CM may include, but is not necessarily limited to, a front camera (C1) and a rear camera (C2). The front camera C1 may be installed to capture an image (also a "video" herein) of a front area before the vehicle HV, and the rear camera C2 may be installed to capture a video of a rear area behind the vehicle HV.

For example, the front camera C1 may be installed at a position on a windshield in a cabin of the vehicle HV near a room mirror, and the rear camera C2 may be installed on a rear window or rear bumper in the cabin of the vehicle HV.

The front camera C1 and the rear camera C2 may support any one of the definitions, for example, high-definition (HD), full HD (FHD), and quad HD (QHD) image quality.

It is to be noted that the front camera C1 and the rear camera C2 do not necessarily provide the same image quality, and a camera of an advanced driver-assistance system (ADAS) of the host vehicle HV may also be used.

In addition, a camera may have an aperture value of F2.0 or less, preferably F1.6 or less. A lower aperture value may allow more light to be gathered, resulting in brighter recordings. In addition, an image tuning technique may be applied to minimize noise and light loss, enabling clear recording even in a dark environment.

The first memory M1 may include any type of storage device in which computer-readable data is stored. For example, it may include at least one of a flash memory, a hard disk memory, a micro type memory, a card type (e.g., an secure digital (SD) or extreme digital (XD)) memory, a random-access memory (RAM), a static RAM (SRAM), a read-only memory (ROM), a programmable ROM (PROM), an electrically erasable PROM (EEPROM), a magnetic RAM (MRAM), a magnetic disk, and an optical disc memory.

In this embodiment, the first memory M1 may be a micro-SD of 64 gigabytes (Gbyte) or more, and may be an external memory. For example, always-on recording while driving (also simply "always-on driving recording" herein) may continue for several hours, and always-on recording while parked (also simply "always-on parking recording" herein) may continue for tens of hours. In addition, event recording based on impact detection may be performed tens of times. The event recording may include impact occurrence-based recording while driving (also simply "driving impact recording" herein) and impact occurrence-based recording while parked (also simply "parking impact recording" herein). In this case, whether the host vehicle HV is in a driving mode or a parking mode may be determined. For example, the driving mode may be determined when a vehicle start switch is in an ignition-on state (e.g., "IGN ON") and otherwise, the parking mode may be determined.

A user may pull out an SD card and connect it to a desktop computer or the like to readily check the contents stored in the card.

In this case, the user may check status information of the SD card through a connected car service (CCS), and may also check when to replace the SD card based on a state of a memory.

The communication module CM1 may be provided for wired or wireless communication with the outside of the vehicle HV, and is not limited to a specific communication protocol.

In this embodiment, the communication module CM1 may include a communication device configured to communicate directly with peripheral devices and may support Wi-Fi, for example. In an embodiment, a Wi-Fi module may include an access point (AP) function, and Wi-Fi may allow the user to easily and quickly access a built-in camera through a smartphone.

The microphone MC may support voice recording. When recording a driving video of the vehicle HV, voice may be recorded in addition to the video.

The impact sensor IS may sense an external impact and may be, for example, a uniaxial or triaxial acceleration sensor.

Although the impact sensor IS dedicated to the built-in camera system BCS may be used, it is to be noted that an acceleration sensor installed in the host vehicle HV may also be used.

A signal from the impact sensor IS may serve as a reference based on which the event recording is started, which will be described later, and the magnitude of an impact on which the reference is based may be set by the user.

For example, the user may select an impact detection sensitivity which is a reference on which the event recording is based when setting the built-in camera system BCS through a display screen (e.g., an audio-video-navigation (AVN) screen described later) in the vehicle HV.

For example, the impact detection sensitivity may be divided into five levels: level 1 (very insensitive), level 2 (insensitive), level 3 (moderate), level 4 (sensitive), and level 5 (very sensitive).

The built-in camera system BCS may be powered by a battery (e.g., a 12V battery) installed in the vehicle HV.

Although the system may be powered by the battery of the vehicle HV while driving and while parked, there may be an issue of excessive battery consumption of the vehicle HV, and thus the auxiliary power battery BT may be included according to an embodiment of the present disclosure.

In an embodiment, the built-in camera system BCS may be powered by the battery of the vehicle HV while driving. For example, it may receive power, while the vehicle HV is driving, from an alternator in the case of an internal combustion engine vehicle, and receive power from any one of a low-power direct current to direct current (DC/DC) (LDC) converter and a DC/DC converter in the case of an electric vehicle, but may receive power from the auxiliary power battery BT while the vehicle HV is parked.

The auxiliary power battery BT may be charged/discharged according to an operating environment of the vehicle HV, and may provide optimal power for recording while the vehicle HV is parked (e.g., "parking recording") and for wireless software updates (e.g., over-the-air (OTA) software updates.

The auxiliary power battery BT may be charged by the battery of the vehicle HV (e.g., a low-voltage battery or high-voltage battery of an electric vehicle), or by an LDC or alternator.

The built-in camera controller BCC may be a higher-level controller that controls other components of the built-in camera system BCS, and may exchange signals with a vehicle controller VC of the host vehicle HV and/or a communication unit (e.g., a data communication unit DCU), a sensor module (SM), automatic performance controllers (APCs), an AVN system, or the like. For example, for such a signal exchange, a local interconnect network (LIN) or controller area network (CAN), or Ethernet may be used.

In this case, the communication unit (e.g., the DCU) may support wireless mobile communication, and the wireless mobile communication may include at least one of a global system for mobile communication (GSM), code-division multiple access (CDMA), wideband CDMA (WCDMA), high-speed downlink packet access (HSDPA), long-term evolution (LTE), and 5G. The communication unit (e.g., the DCU) may also support short-range wireless communication in addition to the wireless Internet communication. The short-range wireless communication may include at least one of Bluetooth, radio frequency identification (RFID), infrared data association (IrDA), ultra-wideband (UWB), ZigBee, near-field communication (NFC), and Wi-Fi direct technologies.

In this case, the sensor module SM may include at least one of a speed sensor, an acceleration sensor, a vehicle position sensor (e.g., a global positioning system (GPS) receiver), a steering angle sensor, a yaw rate sensor, a pitch sensor, and a roll sensor, and the APCs may include at least one of a direction indicator controller, a turn signal controller, a wiper controller, an ADAS controller, and an airbag controller. The sensor module SM may also include a vehicle door open/close sensor and a seat occupancy sensor.

The built-in camera controller BCC may control the other components to perform always-on driving recording, always-on parking recording, event recording that is performed based on an impact signal from the impact sensor IS, or the like.

During the recording, driving information of the vehicle HV may also be recorded.

In this case, the driving information of the vehicle HV may include time, vehicle speed, gear position, direction indicator information (e.g., turn signal information), impact detection degree (any one of the five levels described above), GPS position, or the like.

Although such vehicle driving information may be received from the vehicle controller VC, it is to be noted that the driving information may also be received directly from corresponding modules or components of the vehicle HV. For example, the vehicle speed may be received directly from the speed sensor of the vehicle HV, the direction indicator information (or the turn signal information from the turn signal controller) may be received directly from the direction indicator controller, and the GPS position information may be received from the AVN or GPS receiver.

The event recording may be performed in response to an occurrence of an event detected while the vehicle HV is parked, based on an impact detection sensitivity set by the user, as described above.

During the event recording, the recording may be performed during a period of time from a set time before the event occurs to a set time after the event occurs, and the set times may be selected by the user.

The AVN system may be communicatively connected to the built-in camera controller BCC via the vehicle controller VC or directly connected to the built-in camera controller BCC. The AVN screen may function as a user interface (UI) through which various settings parameters of the built-in camera system BCS are selected by the user.

The built-in camera controller BCC may transmit recorded content to an external server at set intervals, according to what is selected by the user, or upon the occurrence of an event (e.g., an impact detection degree) set by the user.

To perform its functions, the built-in camera controller BCC may include a second memory (M2) and a processor (MP).

For example, the processor MP may include semiconductor integrated circuits and/or electronic elements that perform at least one of comparison, determination, computation, or decision, to achieve programmed functions. For example, the processor MP may be any one or a combination of a computer, a microprocessor (MC), a central processing unit (CPU), an application-specific integrated circuit (ASIC), an electronic circuitry, a logic circuitry, or the like.

The second memory M2 may include any type of storage device in which computer-readable data is stored. For example, it may include at least one of a flash memory, a hard disk memory, a micro-type memory, a card type (e.g., an SD or XD) memory, a RAM, an SRAM, a ROM, a PROM, an EPROM, an MRAM, a magnetic disk, and an optical disc memory.

The second memory M2 may store therein an operating software of the built-in camera controller BCC, and the processor MP may read and execute the software to perform the functions of the built-in camera controller BCC.

The built-in camera controller BCC may also include a buffer memory (BM) for determination, computation, or the like by the processor MP.

The built-in camera controller BCC may also include a supercapacitor (SC). When power is applied to the built-in camera controller BCC, the supercapacitor SC may be charged.

In this case, when power is suddenly blocked due to an impact, damage, or the like, the supercapacitor SC may be used to complete storing a video that is interrupted by the sudden blockage of power.

For example, the supercapacitor SC may have a charging capacity to maintain the power of the built-in camera controller BCC for several seconds to tens of seconds.

In an embodiment, the built-in camera system BCS may include a motion detection sensor.

The motion detection sensor may include, but is not necessarily limited to, a radar (Rd).

The radar Rd may be integrated into the camera module CM. For example, the radar Rd may be integrated and installed in the front camera C1. That is, the front camera C1 may include a radar module.

In an embodiment, motion detection may be performed over a 360-degree omnidirectional area relative to the radar Rd.

In an embodiment, the vehicle may include a rear occupant alert (ROA) system. The ROA system may be used to determine whether an occupant is present in the vehicle during recording while the vehicle is parked (also simply "parking recording"), as described later.

The ROA system may perform a function of alerting the driver of a problem by activating an emergency warning light when a motion is detected by a radar mounted on the rear seat ceiling, for example. Instead of the radar, an ultrasonic sensor may also be used. However, the radar may detect even biometric signals, and determine whether a target of detection is an adult, infant, or pet dog and determine even what number of occupants is on board.

A signal from the ROA system may also be transmitted to the built-in cam controller BCC directly or through the vehicle controller VC.

When performing always-on parking recording, the recording may proceed based on motion detection by the radar Rd through user selection or default settings.

That is, in the always-on parking recording mode, the recording may be performed as a motion of a nearby object is detected by the radar Rd, which may reduce the consumption of the battery BT and greatly increase an available time for parking recording.

Figure 2:
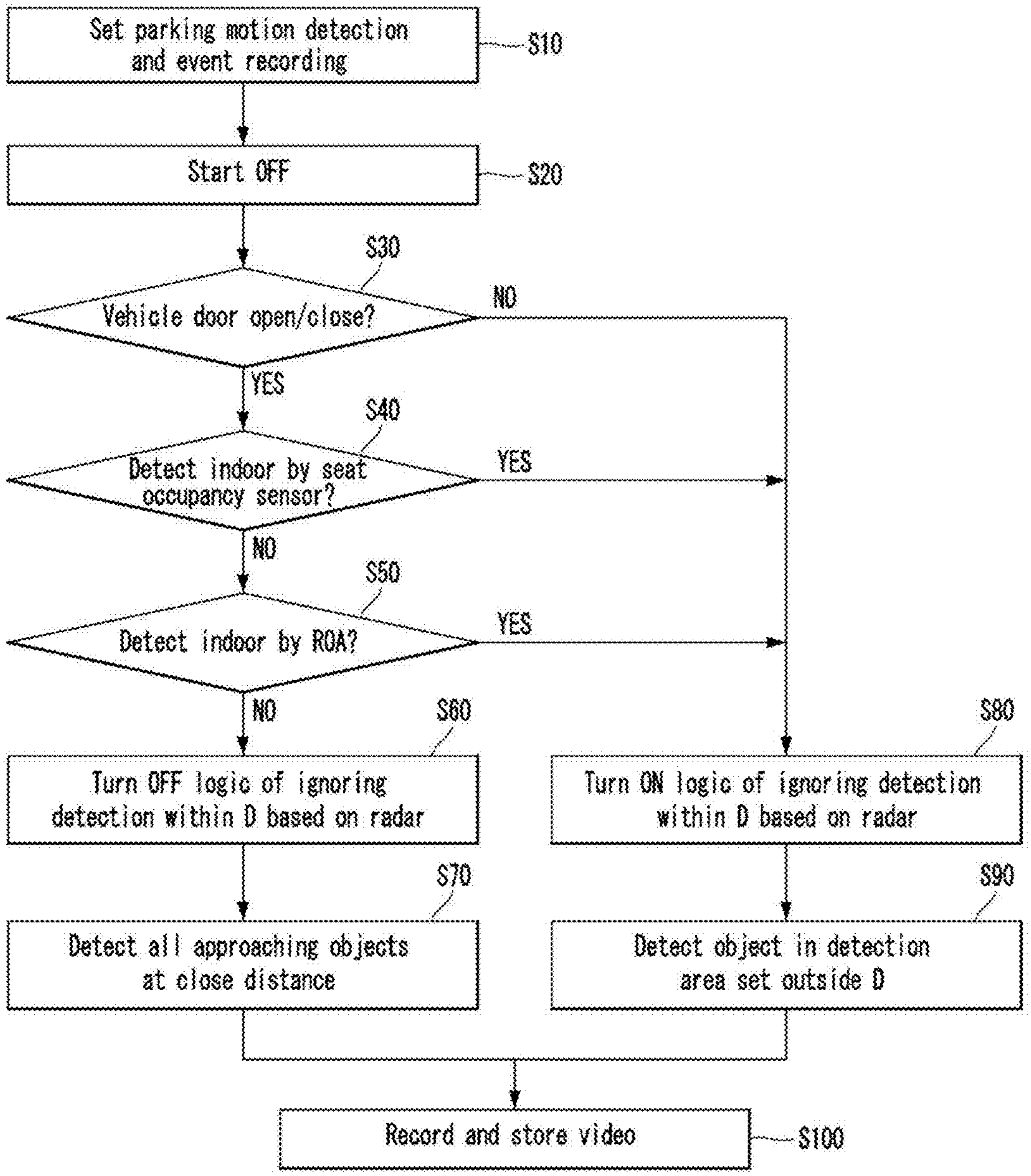
FIG. 2 is a flowchart illustrating a process of controlling a video recording device according to an embodiment of the present disclosure.

Hereinafter, a control process according to an embodiment of the present disclosure will be described in detail with reference to FIG. 2.

Step S10 may be for user settings for the parking recording mode after the driver parks the vehicle and before the driver turns off the start of the vehicle.

The user settings may be performed through the AVN screen and may include, for example, selecting an impact sensitivity for event recording or selecting whether to enable a motion detection function in an always-on parking mode.

In an embodiment, the motion detection function may be provided as an option for the always-on parking mode but is not necessarily limited thereto.

It is apparent that a motion detection recording mode may be included as an example mode separate from the always-on recording mode.

When the user completes the settings for the parking recording and switches the start of the vehicle to "off" in step S20, the built-in camera controller BCC may receive a signal from the vehicle door open/close sensor to determine whether the doors of the vehicle are open and closed, in step S30.

In this case, when it is determined that the doors are open and closed (Yes in step S30), the built-in camera controller BCC may determine whether an occupant is present using a signal of the seat occupancy sensor, in step S40.

When, as a result of the determination using the signal from the seat occupancy sensor, there is no occupant (e.g., No in step S40), a detection result of the ROA system may be received in step S50 to further determine the presence of an occupant.

After the start of the vehicle is off, when there is no door open/close signal (No in step S30), when an occupant is determined to be present by the seat occupancy sensor (Yes in step S40) although the doors are open or closed (Yes in step S30), or when an occupant is determined to be present as a result of detection by the ROA system (Yes in step S50), a logic for ignoring motion detection performed within a set distance d may be maintained to be "on" in step S80.

Figure 3:
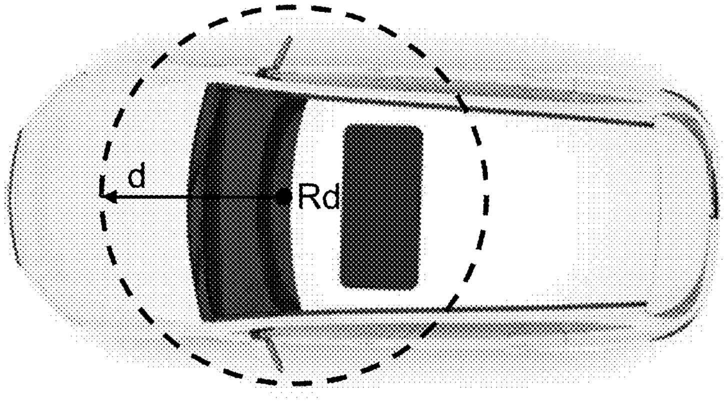
FIG. 3 illustrates an example situation in which a motion is detected based on a set distance according to an embodiment of the present disclosure.

When an occupant is present in the vehicle, a motion detected within the set distance d (as shown in FIG. 3) is likely to be a motion generated by the occupant, and thus the logic may be maintained to be "on" to prevent (e.g., unnecessary) recording.

In this case, when the motion is detected in a detection area out of the set distance d in step S90, a video may be recorded and stored in step S100.

When the logic is applied all the time, there may be a problem that all the motions within the set distance d may be ignored and thus, even in a situation when recording is beneficial (e.g., requiring recording), a (e.g., necessary) video may not be acquired.

For example, in a case where a drunk person or animal climbs onto the hood of the vehicle through a side within the set distance d and causes damage, a video may not be acquired.

Therefore, when the absence of an occupant is confirmed by the detection result of the ROA system in step S50 (NO in S50), the logic may be switched to be off in step S60.

As the logic is switched off, recording may be performed in step S100 for the motion detection within the set distance d in step S70.

Typically, in the always-on parking mode, the camera module may substantially continuously acquire a video of the surroundings of the vehicle while the vehicle is parked and store the video in the first memory M1. Therefore, while parked, the camera module may be (e.g., substantially continuously) operated to acquire a video, and the built-in camera controller BCC and the first memory M1 may also be substantially continuously operated to store the video. This may greatly consume the battery BT, and thus an available recording time while parked may be limited.

According to an embodiment of the present disclosure, however, a video may be acquired and stored (e.g., only) when a motion is detected by the radar Rd, and thus power consumption of the battery BT may be reduced considerably and the available recording time while parked may also be increased greatly.

What is claimed is:

1. A video recording device, comprising:

a camera module configured to obtain a video of surroundings of a vehicle;

a motion detection sensor configured to detect a motion of a nearby object;

a first memory configured to store the video; and a controller configured to control the storing of the video, wherein the controller comprises:

a second memory storing instructions for storing the video, and a processor configured to execute the instructions, wherein the instructions cause, when executed by the processor, the controller to:

determine whether a set condition is satisfied; and store the video based on whether the set condition is satisfied, wherein the set condition includes a first condition regarding whether motion detection has occurred within a set distance, and a second condition regarding whether an occupant is absent in the vehicle.

2. The video recording device of claim 1, wherein, when the motion detection has occurred within the set distance, the controller determines that the first condition is satisfied.

3. The video recording device of claim 2, wherein, when the first condition is satisfied, the controller determines whether the second condition is satisfied.

4. The video recording device of claim 3, wherein, when the first condition is not satisfied, the controller stores the video without determining whether the second condition is satisfied.

5. The video recording device of claim 1, wherein, when no occupant is present in the vehicle, the controller determines that the second condition is satisfied.

6. The video recording device of claim 5, wherein whether the second condition is satisfied is determined based on at least one of a door open/close signal, a seat occupancy sensor signal, and a rear occupant alert (ROA) signal of the vehicle.

7. The video recording device of claim 6, wherein whether the second condition is satisfied is determined based on
at least one of the seat occupancy sensor signal or the ROA signal, along with the door open/close signal.

8. The video recording device of claim 1, wherein the motion detection sensor comprises
a radar installed inside the vehicle.

9. A video recording device, comprising:
a camera module configured to obtain a video of surroundings of a vehicle;
a motion detection sensor configured to detect a motion of a nearby object;
a first memory configured to store the video; and
a controller configured to control the storing of the video, wherein the controller comprises
a second memory storing instructions for storing the video, and
a processor configured to execute the instructions,
wherein the instructions, when executed by the processor, cause the controller to,
when the motion is detected outside a set distance, store the video, and
when the motion is detected within the set distance, store the video based on an occupant absence condition related to the absence of an occupant in the vehicle.

10. The video recording device of claim 9, wherein the instructions further cause the controller to
determine the occupant absence condition using at least one of a door open/close signal, a seat occupancy sensor signal, and a rear occupant alert (ROA) signal of the vehicle.

11. A method of controlling a video recording device comprising a camera module configured to obtain a video of surroundings of a vehicle, a motion detection sensor configured to detect a motion of a nearby object, a first memory configured to store the video, and a controller comprising a second memory storing instructions for storing the video and a processor configured to execute the instructions, the method comprising:
determining, by the processor executing the instructions, whether a set condition is satisfied; and
storing the video based on whether the set condition is satisfied,
wherein the set condition includes:
a first condition regarding whether motion detection has occurred within a set distance; and
a second condition regarding whether an occupant is absent in the vehicle.

12. The method of claim 11, further comprising, when the motion detection has occurred within the set distance, determining that the first condition is satisfied.

13. The method of claim 12, further comprising, when the first condition is satisfied, determining whether the second condition is satisfied.

14. The method of claim 13, further comprising, when the first condition is not satisfied, storing the video without determining whether the second condition is satisfied.

15. The method of claim 11, further comprising, when no occupant is present in the vehicle, determining that the second condition is satisfied.

16. The method of claim 15, wherein determining whether the second condition is satisfied comprises determining whether the second condition is satisfied based on
at least one of a door open/close signal, a seat occupancy sensor signal, and a rear occupant alert (ROA) signal of the vehicle.

17. The method of claim 16, wherein determining whether the second condition is satisfied comprises determining whether the second condition is satisfied based on
at least one of the seat occupancy sensor signal or the ROA signal, along with the door open/close signal.

18. The method of claim 17, further comprising, when at least one of a door open/close signal, a seat occupancy sensor signal, and a rear occupant alert (ROA) signal of the vehicle is present, the controller determines that the second condition is satisfied.

19. The video recording device of claim 6, wherein the controller determines that the second condition is not satisfied when:
the door open/close signal is not present; or
at least one of the seat occupancy sensor signal, and the rear occupant alert (ROA) signal of the vehicle is present.

20. The video recording device of claim 6, wherein, when the door open/close signal is not present, the controller determines whether at least one of the seat occupancy sensor signal, or the rear occupant alert (ROA) signal of the vehicle is present.

* * * * *